UNITED STATES PATENT OFFICE.

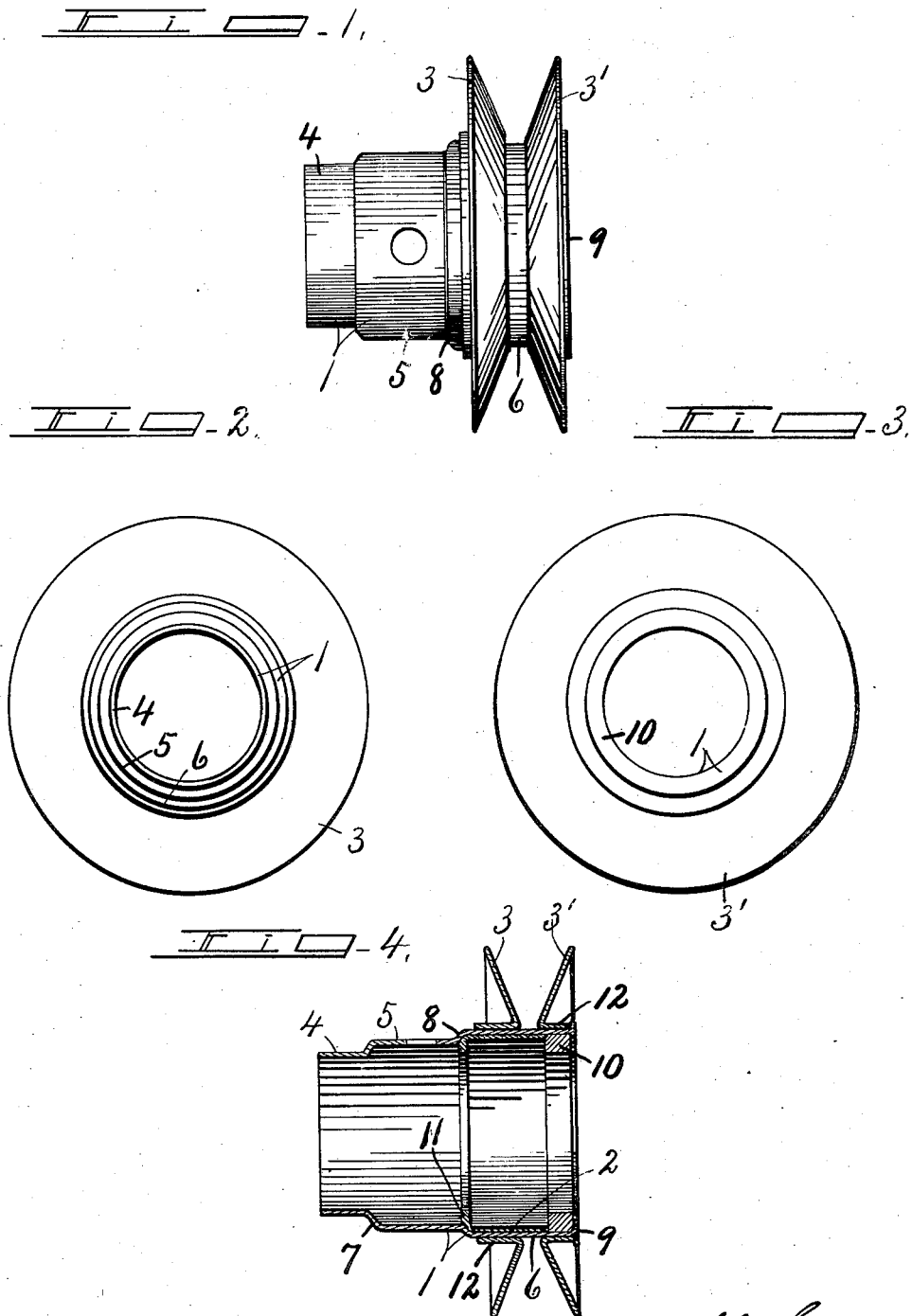

WILLIAM SPARKS, OF JACKSON, MICHIGAN, ASSIGNOR TO THE SPARKS-WITHINGTON COMPANY, OF JACKSON, MICHIGAN, A CORPORATION OF MICHIGAN.

SHEET-METAL PULLEY.

1,090,505.　　　Specification of Letters Patent.　　Patented Mar. 17, 1914.

Application filed August 8, 1912. Serial No. 713,990.

*To all whom it may concern:*

Be it known that I, WILLIAM SPARKS, of Jackson, in the county of Jackson, in the State of Michigan, have invented new and useful Improvements in Sheet-Metal Pulleys, of which the following, taken in connection with the accompanying drawings, is a full, clear, and exact description.

This invention relates to certain improvements in sheet metal pulleys of comparatively small size adapted to be used more particularly in connection with belt driven fans and other revolving parts of automobiles and similar mechanisms requiring comparatively light still running pulleys or sheaves. In this class of power transmissions, it is desirable to use pulleys or sheaves with —V— grooves to receive belts of similar cross sectional form for the purpose of producing a relatively large area of contact and consequent high degree of power transmission. It is also desirable to mount these pulleys or sheaves upon ball or roller bearings and one of the primary objects is to enable the essential parts of the pulley or sheave to be pressed or stamped from relatively thin sheet metal and assembled in such manner as to produce tight fitting joints capable of affording greater rigidity, strength, and durability than would be possible in a pulley of similar size and weight made from a single piece of metal. In other words, I have sought not only to reduce the cost of manufacture and materially increase the output for a given period of time but have also sought to produce a perfectly balanced sheet metal pulley and to increase the gripping power of the flanges upon the belt without subsequent turning, truing or other special machine work, it being understood that the gripping surfaces of the flanges are left in their natural unfinished state, the same as in the stock sheets, so that, while these surfaces are uniformly true, they are unpolished and, therefore, less liable to slip on the belt.

Another object is to reinforce the cylindrical portion of the hub section upon which the flange sections are tightly fitted so as to permit said flange sections to be more firmly pressed upon the hub section without liability of materially varying its diameter.

Other objects and uses will be brought out in the following description.

In the drawings, Figure 1 is a side elevation, and Figs. 2 and 3 are opposite end views of my improved sheave or pulley. Fig. 4 is a longitudinal sectional view of the same pulley.

This pulley comprises a hub section —1—, a reinforcing sleeve or bushing section —2—, and opposed annular flange sections —3— and —3'—, all of which parts are made from comparatively thin sheet metal pressed to the desired form and fitted tightly one upon the other in the manner presently described.

The hub section —1— is tubular in form and provided with stepped portions —4—, —5—, and —6—, gradually increasing in diameter from one end toward the opposite end to form intermediate annular shoulders —7— and —8—, the outer end of the larger cylindrical portion —6— being offset radially and outwardly to form an annular stop shoulder —9— as shown more clearly in Fig. 4. The annular shoulder —7— between the smaller end —4— and intermediate portion —5— of the hub may serve various purposes, such for example as a limiting stop for a bearing cup (not shown), but commonly used in connection with ball bearings, while the annular shoulder —8— at the junction of the intermediate portion —5— and the larger cylindrical portion —6— serves as a limiting stop for the inner end of the sleeve or bushing section —2—. This bushing section is also tubular and of a length somewhat less than the distance between the annular shoulders —8— and —9— and is pressed with a tight fit into the enlarged cylindrical portion —6— of the hub with its inner end in close contact with the annular shoulder —8— while its outer end is some distance within the corresponding end of the cylindrical portion —6—. This sleeve or bushing section —2— serves to reinforce or stiffen the enlarged surrounding portion —6— of the hub to which the flange section —3— and —3'— are applied in the manner presently described and, when the bushing section is thus pressed in operative position, its outer end forms a limiting stop for an annular reinforcing ring —10— which is also pressed with a tight fit into the adjacent end of the hub section —1— but is preferably of thicker metal to additionally stiffen the outer enlarged end of the hub against inward compression, said ring also serving as a retaining means for any ball-cups or other bearings which may be interposed between the bushing and shaft or axle (not shown). The inner end of the sleeve or bushing section —2— is also deflected inwardly and radially to form an annular shoulder —11—, which together with the ring —10— may serve to retain roller bearings (not shown).

The sheet metal flange sections —3— and —3'— flare outwardly and radially from each other and from the periphery of the larger portion of the hub section —1— and are spaced some distance apart, their inner edges being provided with axially extending annular flanges —12— projecting in opposite directions and tightly fitted upon the periphery of the hub. That is, these flanges, which are circular, project from the hub in diverging planes so as to form an annular groove for receiving a belt (not shown).

All of the sheet metal parts are preferably made of stock sheets of uniform thickness pressed by suitable dies into the desired form and also pressed one upon or within the other in the manner shown and described so as to establish close tight fitting joints between them, the outer end of the axially projecting flange —12— of the flange section —3'— being pressed against the annular shoulder —9— on the adjacent end of the hub.

When the hub section —1— is pressed to the desired form, the reinforcing sleeve or bushing —2— may be tightly pressed into the larger open end of the hub section until its inner end is firmly seated against the shoulder —8—, the ring —10— may then be forced under pressure into the same enlarged end of the hub against the outer end of the sleeve or bushing —2— after which the flange section —3'— may be similarly forced under pressure upon the periphery of the enlarged portion of the hub section with its flange —12— seated against the annular shoulder —9— and finally the flange section —3— may be pressed upon the enlarged portion of the hub leaving sufficient annular space between the flange sections for a section of a pulley.

It will be observed that each of the flange sections —3— and —3'— is angular in cross section, the radially projecting portions thereof being disposed at an acute angle with the integral axially extending flange —12— so that when these sections are assembled upon the hub, their outwardly projecting portions will be disposed at an acute angle with each other.

What I claim is:

1. A pulley comprising a sheet metal hub section formed with a stepped portion, a bushing in the larger portion of the hub section, and sheet metal flange sections fitted upon the periphery of said larger portion of the hub section and diverging outwardly from the hub section to form a circumferential channel.

2. A grooved pulley comprising a sheet metal hub section having stepped portions gradually increasing in diameter from one end to the opposite end, a bushing within the larger section and fitting against the shoulder of the adjacent stepped portion, and sheet metal flange sections tightly fitted upon the periphery of the larger portion of the hub section and spaced apart from each other.

3. A grooved pulley comprising a sheet metal hub section having stepped portions gradually increasing in diameter from one end to the opposite end forming annular shoulders at the junctions of said portions, a sheet metal bushing tightly fitted in the larger end of the hub section and having its inner end abutting against one of the annular shoulders, a ring also tightly fitted within the large end of the hub section and abutting against the outer end of the bushing, and outwardly diverging flange sections tightly fitted upon the periphery of the large portion of the hub section and spaced apart from each other.

In witness whereof I have hereunto set my hand this thirteenth day of July 1912.

WILLIAM SPARKS.

Witnesses:
A. I. HAWKINS,
LILLIAN E. WUNDERLICH.